United States Patent [19]

Bui et al.

[11] Patent Number: 5,426,625
[45] Date of Patent: Jun. 20, 1995

[54] MASKING OF TRACKING ERROR SIGNAL ABNORMALITIES DUE TO MEDIA DEFECTS

[75] Inventors: Nhan X. Bui; Alan A. Fennema; Robert A. Klem, all of Tucson, Ariz.

[73] Assignee: International Business Machines Corporation, Armonk, N.Y.

[21] Appl. No.: 252,141

[22] Filed: May 31, 1994

Related U.S. Application Data

[63] Continuation of Ser. No. 26,239, Mar. 1, 1993, abandoned, which is a continuation of Ser. No. 780,654, Oct. 18, 1991, abandoned.

[51] Int. Cl.$^6$ .............................................. G11B 7/00
[52] U.S. Cl. .............................. 369/44.32; 369/44.25; 369/44.28
[58] Field of Search ............... 369/44.28, 44.32, 44.25, 369/54, 58; 360/78.01, 78.04

[56] References Cited

U.S. PATENT DOCUMENTS

| | | | |
|---|---|---|---|
| 4,135,217 | 1/1979 | Jacques et al. | 360/77 |
| 4,414,655 | 11/1983 | Shoji et al. | 369/44 |
| 4,695,989 | 9/1987 | Kimoto | 369/32 |
| 4,748,610 | 5/1988 | Nakata et al. | 369/44.32 |
| 4,839,876 | 6/1989 | Fennema | 369/32 |
| 4,868,819 | 9/1989 | Kimura | 369/32 |
| 4,876,679 | 10/1989 | Mukai | 369/44 |
| 4,959,823 | 9/1990 | Getreuer et al. | 369/44.13 |
| 5,001,732 | 3/1991 | Nomura et al. | 377/3 |
| 5,038,333 | 8/1991 | Chow et al. | 369/44.28 |
| 5,042,019 | 8/1991 | Kitai et al. | 369/44.28 |
| 5,140,574 | 8/1992 | Cloetens et al. | 369/44.28 |

FOREIGN PATENT DOCUMENTS

| | | | |
|---|---|---|---|
| 0505252 | 3/1992 | European Pat. Off. | G11B 7/085 |
| 1023472 | 1/1989 | Japan | G11B 21/08 |
| 1027084 | 1/1989 | Japan | G11B 21/08 |
| 1276474 | 11/1989 | Japan | G11B 21/08 |
| 1277378 | 11/1989 | Japan | G11B 21/08 |

*Primary Examiner*—Georgia Y. Epps
*Assistant Examiner*—P. W. Huber
*Attorney, Agent, or Firm*—D. A. Shifrin

[57] ABSTRACT

In an optical disk recorder, during the sensing of closely-spaced, position-indicating, machine-sensible indicia, a first peak of a track error signal is detected. In response to the first peak being detected, a half-track counter is decremented from a value which depends upon the position of the destination track relative to a current track. In response to the occurrence of a selected value of the half-track counter and the presence of a zero crossing of the tracking error signal, a first timer is activated to mask any defects occurring during the selected first half cycle of the last cycle of the tracking error signal. The half-track counter is again decremented in response to a second peak being detected and the occurrence of a next-to-last zero crossing of the tracking error signal and a second timer is then activated to mask any subsequent defects occurring during the second half cycle of the tracking error signal. The seek operation is terminated when the count value in the half-track counter equals zero and a final zero crossing is detected. Thereafter, a track following operation is activated.

7 Claims, 3 Drawing Sheets

MASKING OF TRACKING ERROR SIGNAL ABNORMALITIES DUE TO MEDIA DEFECTS

This is a continuation of U.S. application Ser. No. 08/026,239, filed Mar. 1, 1993, now abandoned, which is a continuation of U.S. application Ser. No. 07/780,6654 filed Oct. 18, 1990, now abandoned.

FIELD OF THE INVENTION

The present invention relates to position control system, particularly those position systems being advantageously used with optical disk recorders.

BACKGROUND OF THE INVENTION

Both magnetic and optical disk recorders employ either a 14 large plurality of concentric record tracks or a single spiraling record track. The tracks on optical disks are identified by any one of a plurality of surface configurations on the optical medium (disk). A common configuration is a disk-shaped medium having circularly concentric Groove or a single spiral groove, for indicating the location of the record tracks. In both magnetic and optical disks recorders, means are provided for faithfully following one of the addressed record tracks. When it is desired to scan a track other than a currently scanned track, a track seek operation is provided; that is, the track following is aborted and a track seek algorithm is initiated which causes the effective disconnection of the track following operation.

When seeking from one track to another track, magnetic and optical recorder must keep track of its current track on the disk as well as the desired track. This is typically done using a tracking error signal (TES). Tracks are counted as a recording head is moved radially across the tracks between the current track and the desired track. As is well known in the art, during a seek operation, a light beam is moved along with the recording head radially across the tracks. As the light beam moves across the tracks, the TES appears as a sinusoidal or substantial sinusoidal waveform. The peaks of TES are produced at the cliffs between the tracks and grooves on the disk surface. In this manner, the tracks are one full cycle apart.

The simplest method of determining position from the TES is to produce a pulse whenever the TES crosses a zero reference point and then count these pulses. This method, however, is susceptible to miscounting due to noise and disk defects. A superior method, which is used today, utilizes a plurality of TES detectors to indicate zero crossing points and positive and negative peaks. Two peaks of opposite polarities must be encountered before a track crossing is counted. This method allows for greater noise tolerance on the TES. However, media defects can still occasionally result in either the seek operation being too long, i.e. it missed counting a track, or the seek being too short, i.e. counting a defect as a track. As is known in the art, both of these conditions can be recovered from quickly and easily.

The only time a defect can cause a serious problem is when it occurs at the end of the seek operation when a tracking servo is activated. The tracking servo attempts to maintain the TES at the zero reference point. If the tracking servo is activated on a upward slope of the TES when the seeking operation is in a direction toward an outer edge of the disk, the tracking servo will lock on the target track. If, however, the tracking servo is activated on the downward slope, the TES would be opposite to what is needed for a stable condition. Thus, the recording head will "skate" over the disk. In essence, the head will move at an accelerated pace during the downward slope and decelerate over the upward slope. As a result of this activity, a time consuming recovery procedure must activated to stop the skating motion and to lock on the target track. Thus, it is important to activate the tracking servo on the correct slope after a seek operation.

U.S. Pat. No. 4,839,876 discloses an optical disk recorder which includes a position servo control loop for causing a beam of radiation to faithfully follow a track on the disk, jump from a current track to an adjacent track or to a small number of tracks away from the current track. Operation of the position servo loop is altered by selectively reversing the phase of a differentiated position error signal and integrating the differentiated position error signal for comparison with a sawtooth signal for moving the beam of radiation from the current track to an immediately adjacent track under continuous position servo control. Upon reaching the adjacent track, the sawtooth signal returns to a reference potential for initiating track following. The servo error signal and the sawtooth signal does not cause any significant perturbations in the positioning servo loop operation. This patent does not address the problem encountering media defects during a seek operation.

U.S. Pat. No. 5,038,333 discloses a track-seeking apparatus of a disk recorder which employs a track-crossing sensor to produce track-crossing signals. An oscillator is slaved to the sensor for supplying substitute track-crossing pulses in the absence of the sensor providing such pulses or when the radial velocity exceeds a threshold velocity. A velocity profile means alters the oscillator frequency so that the oscillator produces track-crossing pulses in accordance with the profile. This patent does not address the problem of the encountering media defects during a seek operation.

U.S. Pat. No. 5,001,732 discloses a track counter for optical disk which counts the number of tracks a light beam passes upon when an optical head moves over an optical disk in a radial direction. The track counter includes a passage signal generating circuit which generates a signal each time the reflected light of the the light beam passes over a track. A counter counts the signals generated by the passage signal generating circuit. A counter suspending circuit determines that the light beam will pass over a specific position of a track and suspends the action of the counter for a predetermined period of time. A count value compensating circuit assumes the number of tracks the light beam passed during the predetermined period of time and adds this assumed number to the count value of the counter. This invention address problems on the disk in designated areas. It does not address the problem of encountering media defects which may occur in areas other than the designated areas.

Accordingly, it is desired to provide for a drive which is less susceptible to poor optical media quality and provides for more reliability during seek operations.

SUMMARY OF THE INVENTION

It is an object of the present invention to provide an improved positioning system having enhanced track counting and accommodation of defects during track seeking operations.

In an optical disk recorder, during the sensing of closely-spaced, position-indicating, machine-sensible indicia, a first peak of a track error signal is detected. In response to the first peak being detected, a half-track counter is decremented from a value which depends upon the position of the destination track relative to a current track. In response to the occurrence of a selected value of the half-track counter and the presence of a zero crossing of the tracking error signal, a first timer is activated to mask any defects occurring during the selected first half cycle of the last cycle of the tracking error signal. The half-track counter is again decremented in response to a second peak being detected and the occurrence of a next-to-last zero crossing of the tracking error signal and a second timer is then activated to mask any subsequent defects occurring during the second half cycle of the tracking error signal. The seek operation is terminated when the count value in the half-track counter equals zero and a final zero crossing is detected. Thereafter, a track following operation is activated.

The foregoing and other objects, features and advantages of the invention will be apparent from the following more particular description of a preferred embodiment of the invention, as illustrated in the accompanying drawings.

DETAILED DESCRIPTION

Figure 1:
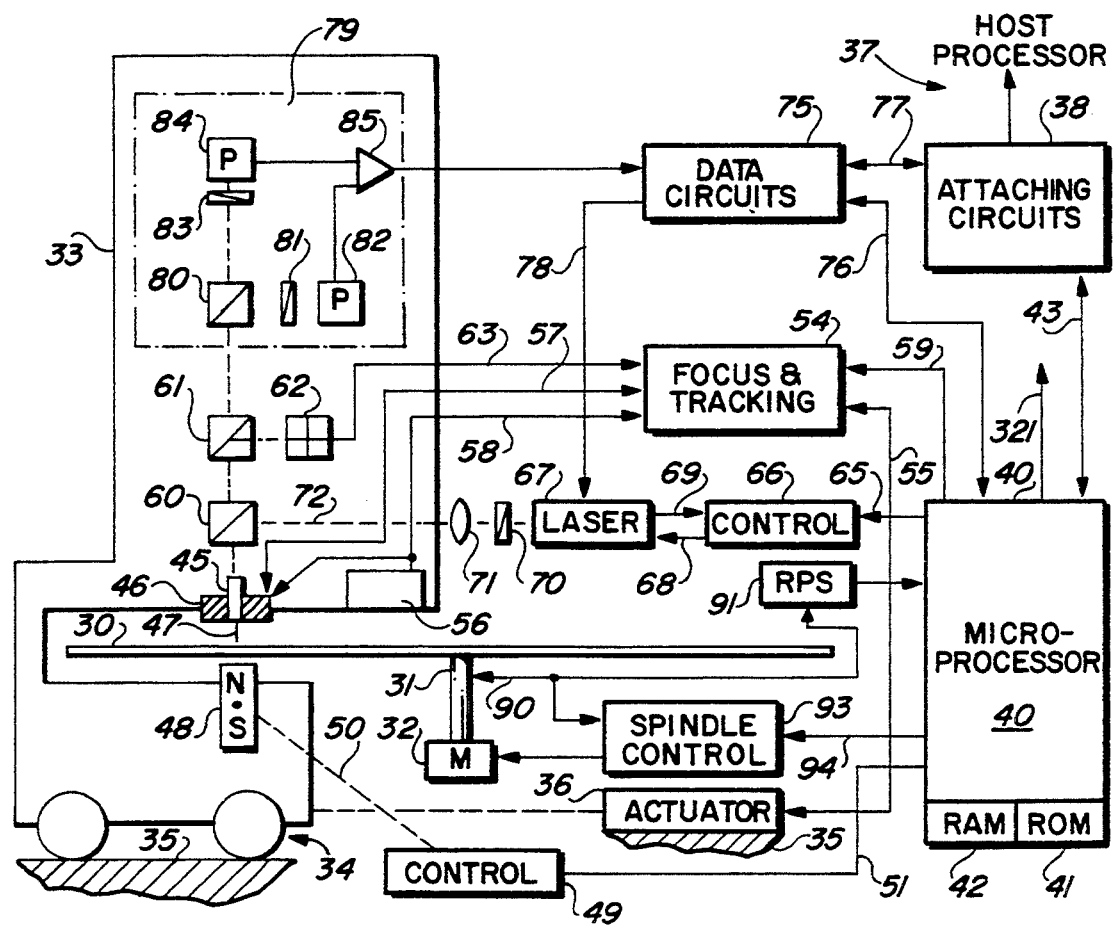
FIG. 1 is a simplified block diagram of an optical disk recorder/player in accordance with the present invention.

Referring now more particularly to the appended drawing, like numerals indicate like structural parts and features in the various figures. An optical recorder with which the present invention may be advantageously employed is shown in FIG. 1. A magnetooptic record disk 30 is mounted on spindle 31 for rotation by motor 32. Optical head-carrying arm 33 on head-arm carriage generally denoted by numeral 34, moves radially of disk 30. A frame 35 of recorder suitably mounts carriage 34 for reciprocating radial motions. The radial motions of carriage 34 enable access to any one of a plurality of concentric tracks or circumvolutions of a spiral track for recording and recovering data on and from the disk. Linear actuator 36 suitably mounted on frame 35, radially moves carriage 34 for enabling track accessing. The recorder is suitably attached to one or more host processors 37, such host processors may be control units, personal computers, large system computers, communication systems, image process processors, and the like.

Attaching circuits 38 provide the logical and electrical connections between the optical recorder and the attaching host processors 37.

Microprocessor 40 controls the recorder including the attachment to the host processor 37. Control data, status data, commands and the like are exchanged between attaching circuits 38 and microprocessor 40 via bidirectional bus 43. Included in microprocessor 40 is a program or microcode storing, read-only memory (ROM) 41 and a data and control signal storing random access memory (RAM) 42.

The optics of the recorder include an objective or focussing lens 45 mounted for focussing and tracking motions on head-arm 33 by fine actuator 46. This actuator includes mechanisms for moving lens 45 toward and away from disk 30 for focussing and for radial movements parallel to carriage 34 motions; for example, for changing tracks within a range of 100 tracks so that carriage 34 need not be actuated each time a track adjacent to a track currently being accessed is to be accessed. Numeral 47 denotes a two-way light path between lens 45 and disk 30.

In magnetooptic recording, magnet 48 (in a constructed embodiment magnet 48 is an electromagnet) provides a weak magnetic steering field for directing the remnant magnetization direction of a small spot on disk 30 illuminated by laser light from lens 45. The laser light spot heats the illuminated spot on the record disk to a temperature above the Curie point of the magnetooptic layer (not shown, but can be an alloy of rare earth and transitional metals as taught by Chaudhari et al., U.S. Pat. No. 3,949,387). This heating enables magnet 48 to direct the remnant magnetization to a desired direction of magnetization as the spot cools below the Curie point temperature. Magnet 48 is shown as oriented in the "write" direction, i.e., binary ones recorded on disk 30 normally are "north pole remnant magnetization". To erase disk 30, magnet 48 rotates so the south pole is adjacent disk 30. Magnet 48 control 49, which is mechanically coupled to rotatable magnet 48 as indicated by dashed line 50, controls the write and erase directions. Microprocessor 40 supplies control signals over line 51 to control 49 for effecting reversal of the recording direction.

It is necessary to control the radial position of the beam following path 47, such that a track or circumvolution is faithfully followed and that a desired track or circumvolution is quickly and precisely accessed. To this end, focus and tracking circuits 54 control both the coarse actuator 36 and fine actuator 46. The positioning of carriage 34 by actuator 36 is precisely controlled by control signals supplied by circuits 54 over line 55 to actuator 36. Additionally, circuits 54 control signals travel over lines 57 and 58, respectively, for focus and fine tracking and switching actions of fine actuator 46. Lines 57, 58 respectively carry a position error signal to circuits 54 and a position control signal from circuits 54 to the focus and tracking mechanisms of actuator 46. Sensor 56 senses the relative position of fine actuator 46 to head-arm carriage 33.

The focus and tracking position sensing is achieved by analyzing laser light reflected from disk 30 over path 47, thence through lens 45, through one-half mirror 60 and to be reflected by half-mirror 61 to a so-called "quad detector" 62. Quad detector 62 has four photo elements which respectively supply signals on four lines collectively denominated by numeral 63 to focus and tracking circuits 54. Aligning one axis of the detector 62 with a track center line, track following operations are enabled. Focussing operations are achieved by comparing the light intensities detected by the four photo elements in the quad detector 62. Focus and tracking circuits 54 analyze the signals on lines 63 to control both focus and tracking.

Recording or writing data onto disk 30 is next described. It is assumed that magnet 48 is rotated to the desired position for recording data. Microprocessor 40 supplies a control signal over line 65 to laser control 66 for indicating that a recording operation is to ensue. This means that laser 67 is energized by control 66 to emit a high-intensity, laser light beam for recording; in contrast, for reading, the laser 67 emitted laser light beam is a reduced intensity for not heating the laser illuminated spot on disk 30 above the Curie point. Control 66 supplies its control signal over line 68 to laser 67 and receives a feedback signal over line 69 indicating the laser 67 emitted light intensity. Control 68 adjusts the light intensity to the desired value. Laser 67, a semiconductor laser such as a gallium arsenide diode laser, can be modulated by data signals so the emitted light beam represents the data to be recorded by intensity modulation. In this regard, data circuits 75 (later described) supply data-indicating signals over line 78 to laser 67 for effecting such modulation. This modulated light beam passes through polarizer 70 (linearly polarizing the beam), thence through collimating lens 71 toward half mirror 60 for being reflected toward disk 30 through lens 45. Data circuits 75 are prepared for recording by the microprocessor 40 supplied control signals over line 76. Microprocessor 40 in preparing circuits 75 is responding to commands for recording received from a host processor 37 via attaching circuits 38. Once data circuits 75 are prepared, data is transferred directly between host processor 37 to data circuits 75 through attaching circuits 38. Data circuits 75 also includes ancillary circuits (not shown) relating to disk 30 format signals, error detection and correction and the like. Circuits 75, during a read or recovery action, strip the ancillary signals from the readback signals before supply corrected data signals over bus 77 to host processor 37 via attaching to 38.

Reading or recovering data from disk 30 for transmission to a host processor requires optical and electrical processing of the laser light beam from the disk 30. That portion of the reflected light (which has its linear polarization from polarizer 70 rotated by disk 30 recording using the Kerr effect) travels along the two-way light path 47, through lens 45 and half-mirrors 60 and 61 to the data detection portion 79 of the head-arm 33 optics. Half-mirror or beam splitter 80 divides the reflected beam into two equal intensity beams both having the same reflected rotated linear polarization. The half-mirror 80 reflected light travels through a first polarizer 81, which is set to pass only that reflected light which was rotated when the remnant magnetization on disk 30 spot being accessed has a "north" or binary one indication. This passed light impinges on photo cell 82 for supplying a suitable indicating signal to differential amplifier 85. When the reflected light was rotated by a "south" or erased pole direction remnant magnetization, then polarizer 81 passes no or very little light resulting in no active signal being supplied by photocell 82. The opposite operation occurs by polarizer 83 which passes only "south" rotated laser light beam to photo cell 84. Photocell 84 supplies its signal indicating its received laser light to the second input of differential amplifier 85. The amplifier 85 supplies the resulting difference signal (data representing) to data circuits 75 for detection. The detected signals include not only data that is recorded but also all of the so-called ancillary signals as well. The term "data" as used herein is intended to include any and all information-bearing signals, preferably of the digital or discrete value type.

The rotational position and rotational speed of spindle 31 is sensed by a suitable tachometer or emitter sensor 90. Sensor 90, preferably of the optical sensing type that senses dark and light spots on a tachometer wheel (not shown) of spindle 31, supplies the "tach" signals (digital signals) to RPS circuit 91 which detects the rotational position of spindle 31 and supplies rotational information-bearing signals to microprocessor 40. Microprocessor 40 employs such rotational signals for controlling access to data storing segments on disk 30 as is widely practiced in the magnetic data storing disks. Additionally, the sensor 90 signals also travel to spindle speed control circuits 93 for controlling motor 32 to rotate spindle 31 at a constant rotational speed. Control 93 may include a crystal controlled oscillator for controlling motor 32 speed, as is well known. Microprocessor 40 supplies control signals over line 94 to control 93 in the usual manner.

Figure 2:
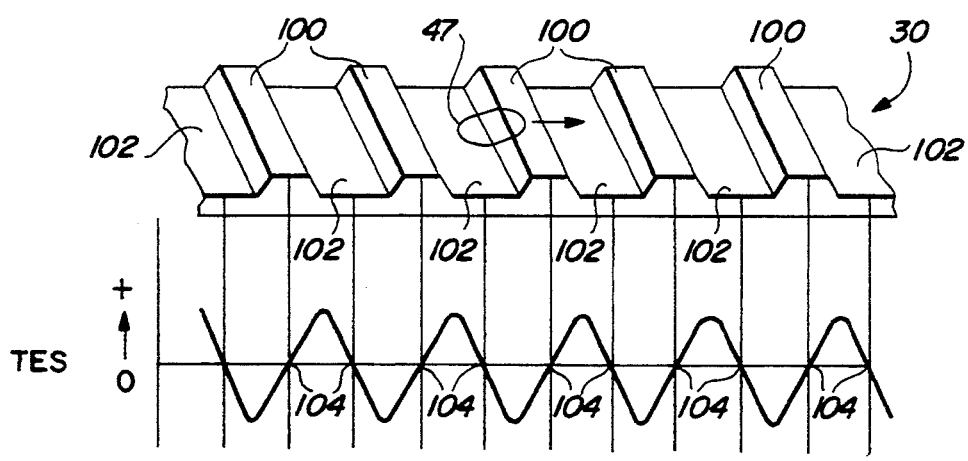
FIG. 2 spatially illustrates the relationship of tracks and tracking error signals.

Referring to FIG. 2, a portion of the information-bearing surface of disk 30 is illustrated. The disk 30 is formed with two sets of concentric rings, one set being tracks or mesas 100 and the second set being grooves 102. When the light beam 47 is focused into a groove 102, the TES is at a zero crossing position 104, i.e. when exactly centered, the sensed TES should be at zero. As the light beam 47 moves from one track to another track, the amplitude of TES changes as a sinusoid with the direction of change indicating the direction of tracking error. As the light beam 47 scans transversely (radially) across the tracks 100 or grooves 102, TES takes the sinusoidal shape wherein zero axis crossings in a first direction signify crossing the center of the grooves. Similarly, when the light beam 47 is crossing the tracks 100, the zero access crossing of TES is in the opposite direction. In essence, the peaks of TES are produced at the cliffs between the tracks 100 and the grooves 102 on the surface of the disk 30.

Figure 3:
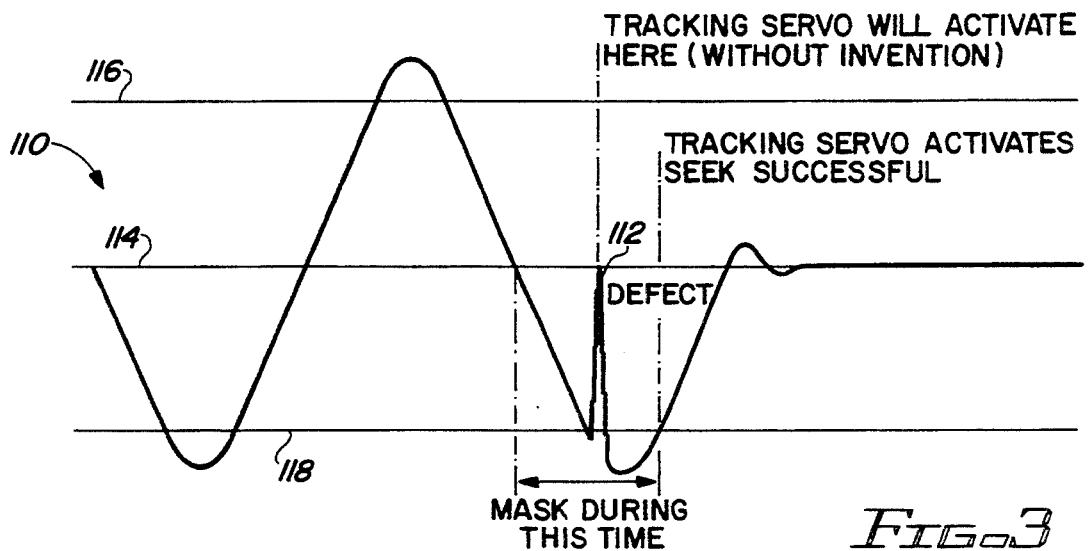
FIG. 3 is a waveform illustrating a defect occurring during a second half cycle of the last cycle of a tracking error signal.

FIG. 3 illustrates a portion of a TES signal 110 wherein a defect 112 occurs during the last half cycle of the signal. It is understood that a seek in an opposite direction would invert the polarity of the TES and its slope in the discussion to follow. As stated above, one method of minimizing the susceptibility of the optical recorder to noise and disk defects is to use three TES detectors (not shown). These detectors indicate when the TES crosses a zero reference point and the positive peaks and the negative peaks of TES. Two peaks of opposite polarities must be encountered before a track is counted. Further as noted above, the TES signal 110 is sinusoidal whose positive peak exceeds a positive threshold 116 and whose negative peak exceeds a negative threshold 118. The positive and negative peaks of TES signal 110 must exceed the respective thresholds 116 and 118 in order to be considered a peak during a seek operation. Moreover, the TES signal 110 normally crosses a zero reference point 114 between positive and negative peaks. At the conclusion of a seek operation, a track servo (not shown) is activated to continue a track following operation on the desired track. Detail of the tracking circuits are disclosed in U.S. Pat. No. 5,038,333 which issued to W. W. Chow et al, assigned to the assignee of the present case and is hereby incorporated herein by reference. During the second half cycle of the last cycle of the TES signal 110, the defect 112 causes the detection of a negative pulse which exceeds the negative threshold 118 and could be interpreted as a zero crossing. The tracking servo normally activates after sequence of a positive pulse, a first zero crossing, a negative pulse and a second zero crossing. Moreover, if the tracking servo activates on an upward slope of the TES signal 110 after encountering the above sequence, it will be in a stable condition and will successfully lock onto the desired track. In view of the defect 112, the sequence includes a positive pulse, a first zero crossing, a negative pulse and a second zero crossing. However, the slope of the TES signal 110 is downward which cause an unstable condition when the tracking servo activates and causes a error in a subsequent track following operation.

Figure 4:
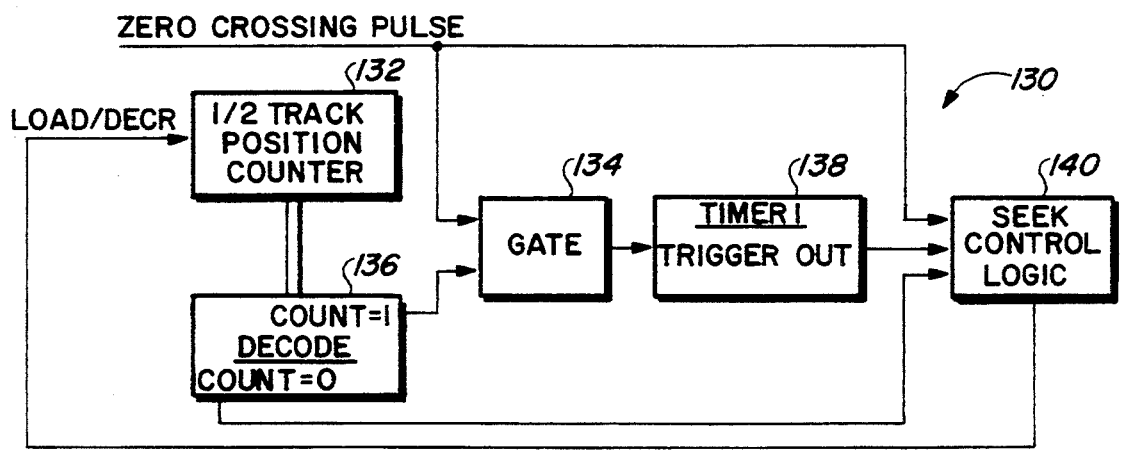
FIG. 4 is a block diagram of a circuit for masking the type of defect shown in FIG. 3 in accordance with the present invention.

FIG. 4 shows a block diagram of a masking circuit 130 which eliminates the error caused by the defect 112 (FIG. 3) encountered during the last half cycle of the TES signal 110. Circuit 130 includes a half-track counter 132. Prior to a seek operation, counter 132 is loaded with a count value which is equal to the number of half-tracks between the present track and the desired track. For purposes of illustration and not limitation, if a seek operation to be executed involves a movement to a track which is two tracks away from the current track, the count value in counter 132 is set equal to a value of four which coincides to four half-tracks. Thereafter, counter 132 is decremented one count for each half-track of movement. As is shown in FIG. 3, one half-track is equal to one half cycle of the TES signal 110. Circuit 130 further includes an AND gate 134 which receives an indication when the TES signal 110 performs a zero crossing and and input from a decoder/comparator 136. Comparator 136 compares the count value of the counter 132 with a value of one. Gate 134 is coupled to a timer circuit 138. The timer circuit 138 is coupled to the seek control logic 140. The details of the timer circuit and the seek control logic are well known in the art and will not be discussed here.

In operation, during a seek operation, the optical recorder will always arrive at the destination or desired track with a constant velocity plus or minus some tolerance. Thus, any defect that may occur during the downward slope of the last peak can be masked out. The timer circuit 138 is activated upon the occurrence of the next-to-last zero crossing of the TES signal 110 and a count value of one in the counter 132. The next-to-last zero crossing of the TES signal 110 occurs when the count value of the counter 132 equals a value of one and zero crossing of the TES signal occurs. The activation of timer circuit 138 facilitates the blocking of the final zero crossing point of the TES signal 110 for a predetermined time. The timer circuit 138 must have a time interval which is equal to the time required to reach a last peak immediately prior to the required time to terminate the seek operation.

Figure 5:
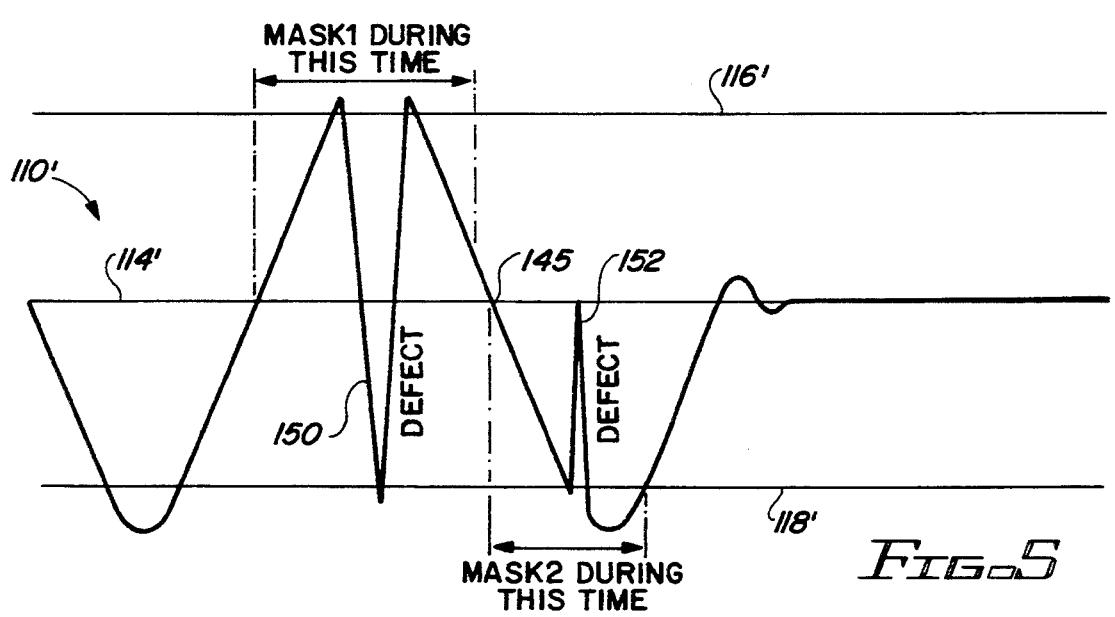
FIG. 5 is a waveform illustrating a defect occurring during the first and second half cycles of the last cycle of a tracking error signal.

FIG. 5 illustrates a TES signal 110' wherein a defect 150 occurs in the first half cycle and a defect 152 occurs during the second half cycle of the signal. The TES signal 110' is sinusoidal whose positive peak exceed a positive threshold 116' and whose negative peak exceed a negative threshold 118'. The positive and negative peaks of TES signal 110' must exceed the respective thresholds 116' and 118' in order to be considered a peak during a seek operation. Moreover, the TES signal 110' normally crosses a zero reference point 114' between positive and negative peaks. Although defect 150 is slightly different from defect 112, the same techniques can be used to resolve the media defect condition. As illustrated in FIG. 5, defect 150 goes beyond the threshold point 118' and would appear as a true track crossing. With this condition, the normal seek algorithm would be fooled into activating the tracking servo on the wrong slope of the TES signal 110'. Moreover, as set forth above, in view of the constant and predictable velocity (within a specific tolerance) at the end of the seek operation, it can be predicted, using a masking circuit similar to circuit 130, that the last peak caused by defect 150 comes well before the predicted time.

Figure 6:
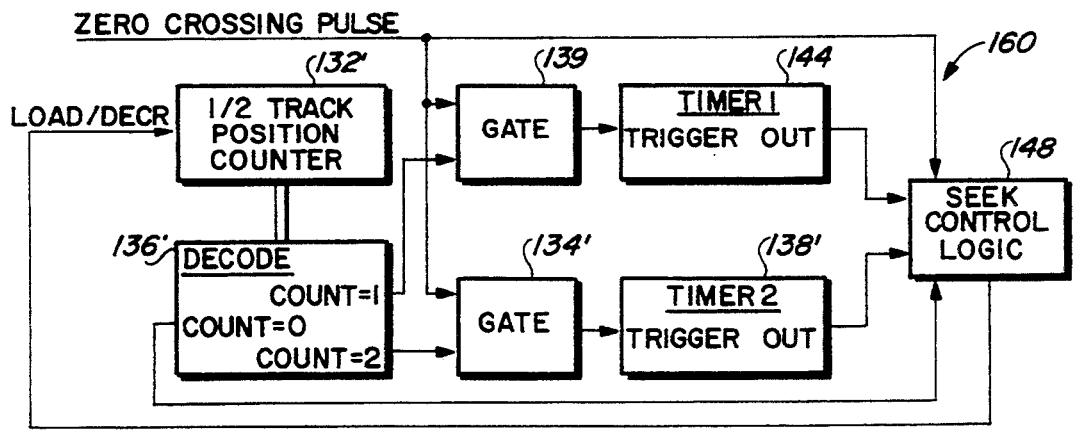
FIG. 6 is a block diagram of a circuit for masking the types of defects shown in FIG. 5 in accordance with the present invention.

FIG. 6 illustrates a block diagram of a masking circuit 160 which eliminates the errors caused by the defects 150 and 152 (FIG. 5). Circuit 160 includes a half-track counter 132'. Prior to a seek operation, counter 132' is loaded with a count value which is equal to the number of half-tracks between the present track and the desired track. For purposes of illustration and not limitation, if a seek operation to be executed involves a movement to a track which is two tracks away from the current track, the count value in counter 132' is set equal to a value of four which coincides to four half-tracks. Thereafter, counter 132' is decremented one count for each half-track of movement. Circuit 160 further includes an AND gate 134' which receives an indication when the TES signal 110' performs a zero crossing and an input from a decoder/comparator 136'. Comparator 136' compares the count value of the counter 132' with values of one and two. AND gate 134' is coupled to a first timer circuit 138'. The first timer circuit 138' is coupled an input of an AND gate 139. AND gates 134' and 139 each receive an input from the comparator 136' and an indication when a zero crossing has occurred. AND gate 139 is coupled to a second timer circuit 144. The second timer circuit 144 is coupled to the seek control logic 148. The details of the timer circuits 138' and 144, and the seek control logic 148 are well known in the art and will not be discussed here.

In operation, during a seek operation, the optical recorder will always arrive at the destination or desired track with a constant velocity plus or minus some tolerance. Thus, any defect that may occur during the downward slope of the last peak can be masked out. The first timer circuit 138' is activated upon the occurrence of the zero crossing of the TES signal 110' and when the count value of the half-track counter 132' equals two. The count value of two in the half-track counter 132' represents either the first half cycle of the TES signal 110' if the destination track is the next adjacent track or the first half cycle of the last track prior to the destination track. The activation of the first timer circuit 138' facilitates the blocking of the defect 150 of the TES signal 110' for a predetermined time. The first timer circuit 138' must have a time interval which is equal to the time required to reach beyond the expected passing of threshold 116' but prior to the next-to-last zero crossing point 145 (FIG.5). When the first timer 138' has timed-out, it sends a signal to AND gate 139. Upon the occurrence of a count value of one in the half-track counter 136' and that of the next-to-last zero crossing point, the second timer circuit 144 is activated to mask out the defect 152 in a similar manner set forth above for defect 112.

Figure 7:
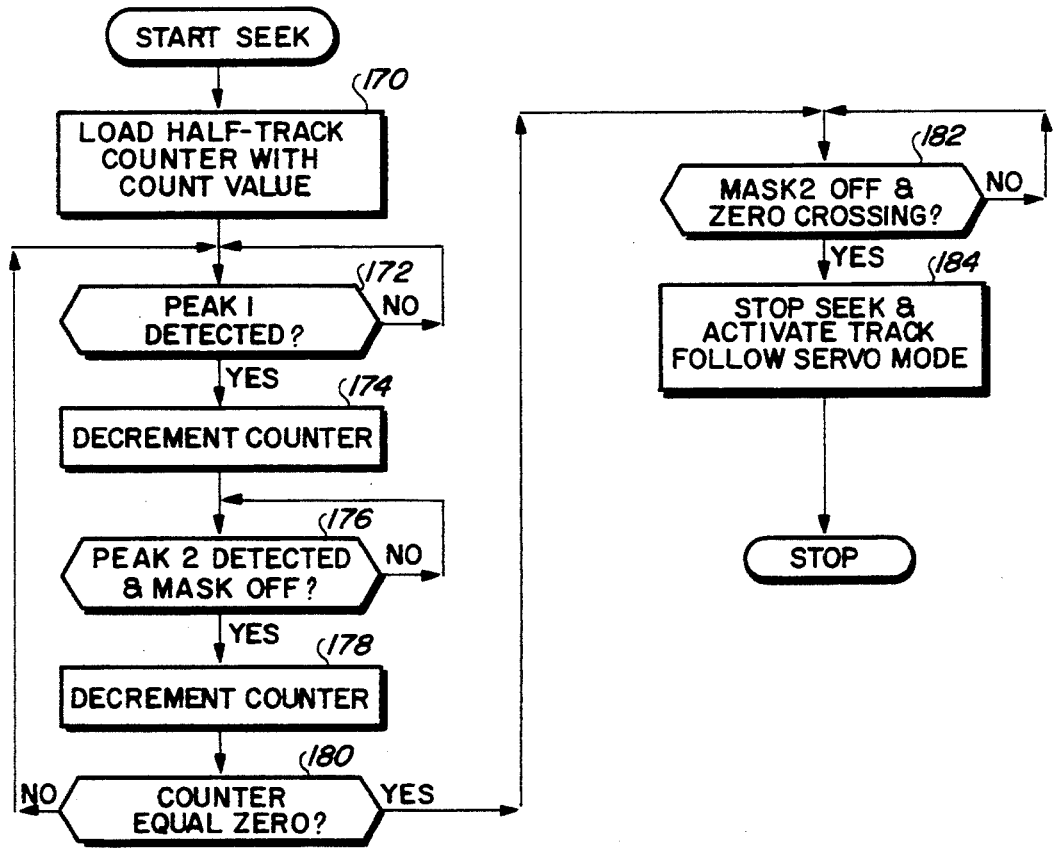
FIG. 7 is a flow chart illustrating the steps utilized in masking the defects shown in FIGS. 3 and 5.

FIG. 7 is a flow chart which illustrates the steps utilized in masking out media defects encountered during a seek operation in accordance with the present invention. In step 170, prior to initiating the seek operation, the half-track counter 132 or 132' are loaded with the appropriate count value reflective of the number of half-tracks between the current track and the destination or desired track. Step 172 determines whether a first peak has been detected. Step 174 decrements the half-track counter 132 or 132' subsequent to the detection of the first peak. Step 176 determines whether a second peak has been detected and whether the first mask procedure has not been activated. Step 178 facilitates the decrementing of the half-track counter 132 or 132' in response to the second peak being detected and the first mask procedure not being activated. Step 180 determines whether the half-track counter 132 or 132' has reached a count of zero. Step 182 determines whether the second mask procedure is activated and whether there has been a zero crossing. If the second mask procedure is not activated and there is a zero crossing, the seek operation is completed and a track following operation is initiated in step 184.

While the invention has been particularly shown and described with reference to preferred embodiment thereof, it will be understood by those skilled in the art that various changes in form and details may be made therein without departing from the spirit and scope of the invention.

What is claimed is:

1. An optical disk drive apparatus for masking tracking error signal abnormalities encountered during the end of a seek operation, comprising:

an optical head for focusing a light beam on a surface of an optical disk, the disk having data recording tracks;

means for generating a periodic, analog tracking error signal during a seek operation in which the light beam traverses across tracks to a desired destination track, each period of the tracking error signal representing the passage of the light beam across one track on the disk surface and including, when no abnormalities are present, a first peak of a first polarity separated by a zero crossing from a second peak of a second, opposite polarity;

first and second detectors for detecting the first and second peaks, respectively, of each period of the tracking error signal;

a counter for generating a track count signal when said first and second detectors detect consecutive first and second peaks having values in excess of first and second thresholds, respectively, during the seek operation;

indicating means, responsive to said counter, for indicating the beginning of a last track immediately preceding the destination track;

blocking means, responsive to said indicating means, for inhibiting detection of the tracking error signal during a first predetermined portion of a last period of the tracking error signal representing the last track, which first portion includes the second peak of the last period, whereby defects of the tracking error signal are masked; and enabling means, initiated at the end of the first portion of the last period, for enabling detection of the tracking error signal for the remainder of the last period to facilitate successful termination of the seek operation and activation of a track following operation.

2. The disk drive apparatus of claim 1, wherein:

said blocking means comprises means for inhibiting detection of the tracking error signal during a second predetermined portion of the last period, which second portion includes the first peak of the last period; and said enabling means comprises means, initiated at the end of the second portion of the last period, for enabling detection of the tracking error signal until the commencement of the first portion.

3. The drive apparatus of claim 2, wherein said blocking means comprises:

a first timer activated upon the detection of the first zero crossing after the detection of the first peak of the last period to commence the first portion; and a second timer activated by said indicating means indicating the beginning of the last track to commence the second portion.

4. The drive apparatus of claim 1, wherein said blocking means comprises a second timer activated upon the detection of the first zero crossing after the detection of the first peak of the last period.

5. A machine-effected method of masking tracking error signal abnormalities encountered during the end of a seek operation in an optical disk drive, comprising the steps of:

traversing a light beam across tracks of an optical disk during a seek operation to a desired destination track;

generating a periodic, analog tracking error signal during the seek operation, each period of the tracking error signal representing the passage of the light beam across one track on the disk surface and including, when no abnormalities are present, a first peak of a first polarity separated by a zero crossing from a second peak of a second, opposite polarity;

detecting the first and second peaks, respectively, of each period of the tracking error signal;

comparing values of the first and second peaks with first and second thresholds, respectively, during the seek operation and generating a track count signal when consecutive first and second peaks have values in excess of the first and second thresholds, respectively;

comparing the number of track count signals generated with a number representing a last track immediately preceding the destination track, whereby the beginning of the last track is detected;

inhibiting detection of the tracking error signal during a first predetermined portion of a last period of the tracking error signal representing the last track, which first portion includes the second peak of the last period, whereby defects of the tracking error signal are masked; and enabling detection of the tracking error signal at the end of the first portion of the last period for the remainder of the last period to facilitate successful termination of the seek operation and activation of a track following operation.

6. The method of claim 5, further comprising the steps of:

inhibiting detection of the tracking error signal during a second predetermined portion of the last period, which second portion includes the first peak of the last period; and enabling detection of the tracking error signal at the end of the second portion of the last period until the commencement of the first portion.

7. The method of claim 6, wherein:
said step of inhibiting detection of the tracking error signal during the first portion comprises the step of activating a first timer at the first zero crossing after the first peak of the last period; and
said step of inhibiting detection of the tracking error signal during the second portion comprises the step of activating a second timer at the beginning of the last track.

* * * * *